United States Patent [19]

Furumura et al.

[11] Patent Number: 4,842,426
[45] Date of Patent: Jun. 27, 1989

[54] BEARING ASSEMBLY

[75] Inventors: Kyozaburo Furumura, Ninomiya; Shigeki Matsunaga, Tokyo, both of Japan

[73] Assignee: Nippon Seiko Kabushiki Kaisha, Tokyo, Japan

[21] Appl. No.: 133,558

[22] Filed: Dec. 16, 1987

Related U.S. Application Data

[63] Continuation-in-part of Ser. No. 774,077, Sep. 9, 1985, abandoned.

[51] Int. Cl.$^4$ .......................... F16C 33/82; F16J 15/40
[52] U.S. Cl. ...................................... 384/478; 277/80; 277/135; 384/133; 384/446
[58] Field of Search ............... 384/132, 133, 446, 478, 384/607, 448; 277/135, 80

[56] References Cited

U.S. PATENT DOCUMENTS

| | | | |
|---|---|---|---|
| 3,620,584 | 11/1971 | Rosensweig | 384/446 |
| 4,043,616 | 8/1977 | Zimmer | 384/446 X |
| 4,293,137 | 10/1981 | Ezekial | 384/478 X |
| 4,526,380 | 7/1985 | Raj et al. | 277/135 X |
| 4,531,846 | 7/1985 | Raj | 384/478 |
| 4,628,384 | 12/1986 | Raj et al. | 384/478 X |
| 4,692,826 | 9/1987 | Raj et al. | 384/478 X |

FOREIGN PATENT DOCUMENTS

| | | | |
|---|---|---|---|
| 655858 | 4/1979 | U.S.S.R. | |
| 0781469 | 11/1980 | U.S.S.R. | 277/80 |

*Primary Examiner*—Thomas R. Hannon
*Attorney, Agent, or Firm*—Louis E. Marn

[57] ABSTRACT

A bearing assembly comprised of a housing, a shaft extending through the housing, a bearing disposed between the housing and the shaft and a seal disposed among the housing, the shaft and the bearing. The seal comprises an annular magnet, a pole piece affixed to the annular magnet and a ferrofluid injected into a gap between the pole piece and the shaft. Thus, a magnetic circuit for retaining the ferrofluid is formed by the seal, the bearing and the pole piece.

2 Claims, 3 Drawing Sheets

BEARING ASSEMBLY

RELATED APPLICATION

This application is a continuation-in-part of U.S. application Ser. No. 06/774,077, filed Sept. 9, 1985. now abandoned.

BACKGROUND OF THE INVENTION (1) Field of the Invention

This invention relates to a bearing assembly with a seal structure including a ferrofluid.

(2) Description of the Prior Art

Referring to FIGS. 3 and 4, there are shown conventional bearing assemblies which are used, for example in a magnetic disc motor, and wherein a housing H receives a shaft S on which is disposed a bearing means B. Sealing means C and rotor R are fixed to an outer circumference of the rotor R. A pulley P is fixed to the shaft S and is driven by a belt (not illustrated). A dust prevention casing F is provided about the rotor R.

The bearing means B is comprised of an outer race 1, an inner race 2, a plurality of balls 3 disposed between the outer race 1 and the inner race 2 and a pair of cover members 4 for covering openings between the races 1 and 2 and a retainer D. A stopper ring 5 is mounted to the housing H.

As shown in FIG. 4, the seal means C includes a pair of pole pieces 6, 6, an annular magnet 7 disposed between the pair of pole pieces 6, 6 and a ferrofluid injected into gaps g formed between the pole pieces 6, 6 and the shaft S. A seal member 8 is comprised of pole pieces 6, 6 and the annular magnet 7. The seal member 8 is disposed at the rotor R side of the bearing means B by way of a non-magnetic spacer 9 disposed between a right side pole piece 6 and the outer race 1. The outer periphery of the seal member 8 is fixed within an inner periphery of the housing H.

With such construction, there is formed a magnetic circuit 11 between the pole pieces 6, 6 and the shaft S via the annular magnet 7. The ferrofluid 10 injected into the gaps g maintains a sufficient pressure resistance. As a result, an evaporated mist of a lubricant, such as, for example grease, in the bearing means B can be sealed completely in a manner to prevent leakage of the lubricant.

In the aforesaid conventional bearing assembly, the seal means C is of a three-pieced structure comprised of the pair of pole pieces 6, 6 and the annular magnet 7. Further, the seal means C is spaced apart from the bearing means B by the spacer 9. Accordingly, the total width of the two pole pieces 6, 6, the annular magnet and the spacer 9 is large, so that such a seal means is not suitable for thin application.

As hereinabove described, since the seal member 8 is of a three-pieced structure, fixation of the two pole pieces 6, 6 to the annular magnet 7 is cumbersome. In addition, there is the problem that it is difficult to obtain exact concentricity of each pole piece. As a result, when fixing the pole pieces 6, 6 within the housing H, the gap g between each pole piece 6, 6 and the shaft S becomes irregular thereby resulting in irregular pressure resistance of the ferrofluid retained in the gaps. Consequently, pressure resistance is partially decreased and durability of the seal means may deteriorate.

OBJECTS OF THE INVENTION

Accordingly, it is a general object of the present invention to provide a bearing assembly which permits the manufacture of a compact motor with enhanced accuracy of seal means incorporated into the bearing assembly.

SUMMARY OF THE INVENTION

These and other objects of the present invention are achieved by a bearing assembly comprised of a housing assembly, a shaft extending through the housing, bearing means disposed between the housing and the shaft and seal means disposed between the housing and the shaft. The seal means is comprised of an annular magnet, a pole piece affixed to the annular magnet and a ferrofluid injected into a gap between the pole piece and the shaft with magnetic circuits for retaining the ferrofluid being formed by the seal means, the bearing means and the pole piece.

BRIEF DESCRIPTION OF THE DRAWINGS

These and other objects of the present invention will become apparent from the following detailed description when taken with the accompanying drawings, wherein.

DETAILED DESCRIPTION OF THE INVENTION

Figure 1:
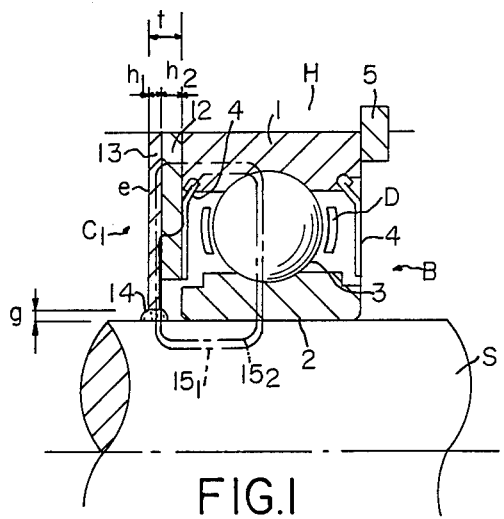
FIG. 1 is a partial sectional view of a bearing assembly according to one embodiment of the present invention.
Figure 3:
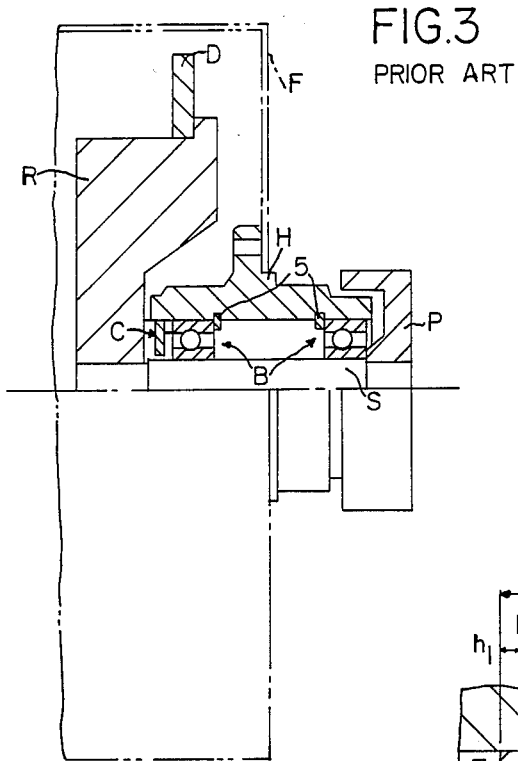
FIG. 3 is a sectional view of a conventional bearing assembly.
Figure 4:
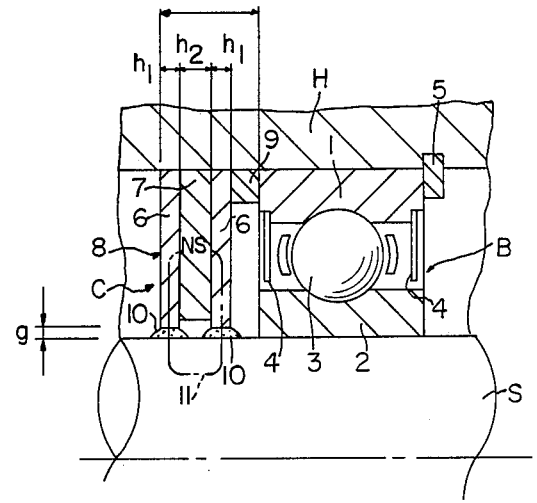
FIG. 4 is an expanded view of the bearing structure of FIG. 3.

Referring to FIG. 1. illustrating an improvement to the prior art of FIG. 4 wherein the seal means is different from that of the prior art. Since the components of this embodiment, other than the seal means have the same designations as the bearing structure of FIGS. 3 and 4, the description of such common components is omitted.

In FIG. 1, the seal means $C_1$ is comprised of an annular magnet 12 affixed to the outer race 1, an annular pole piece 13 affixed to the annular magnet 12 and ferrofluid 14 injected into a gap g formed between the pole piece 13 and the shaft S. The annular magnet 12 may be affixed to a side of the outer race 1 and to a side of the grease seal plate 4. Both the annular magnet 12 and the annular pole piece 13 are joined to each other to form a seal member e.

An object of affixing the annular magnet 12 to the grease seal plate 4 is to increase magnetic flux in the case that a contact area of the annular magnet 12 and the outer race 1 is small and of decreased magnetic flux. Between the pole piece 13 and the shaft S is a gap g. Ferrofluid 14 is injected into the gap g due to the predetermined exact concentricity of the pole piece 13 relative to the housing H and the shaft S as well as the concentricity of the annular magnet 12 relative to the housing H and the inner race 2.

Under such aforesaid construction, magnetic circuits $15_1$ and $15_2$ are formed referring to FIG. 1, among the seal means $C_1$, the bearing means B and the shaft S whereby the ferrofluid 14 injected into the gap g between the pole piece 13 and the shaft S maintains a sufficient pressure resistance to perform a sealing function.

The magnetic circuits $15_1$ and $15_2$ only leave a slight space in the gap g, and are formed by a direct combination of the pole piece 13, the outer race 1, the balls 3, the inner race 2 and the shaft S, respectively. Thus magnetic circuit $15_1$ is formed by the annular magnet 12, the outer race 1, the balls 3, the inner race 2, the shaft S, the gap 14 and the pole piece 13 and the magnetic circuit $15_2$ is formed by the annular magnet 12, the grease seal plate 4, the outer race 1, the balls 3, the inner race 2, the shaft S, the gap 14 and the pole piece 13.

Figure 5:
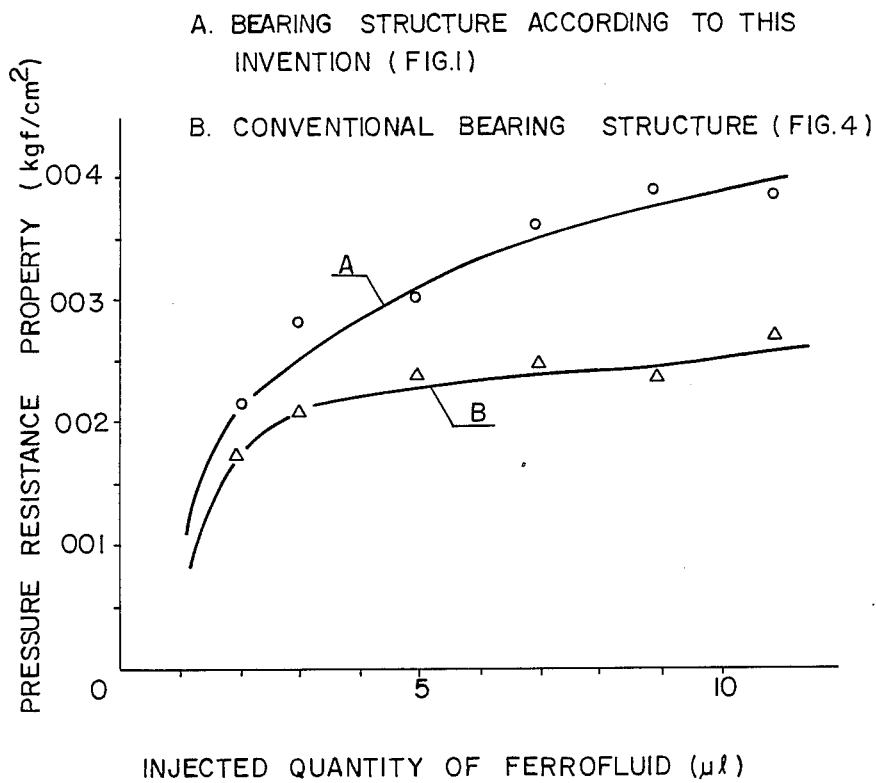
FIG. 5 is a graph, in which the pressure resistance property of the seal means of the bearing assembly of FIG. 1 is compared with that of a conventional seal means for a bearing assembly.

FIG. 5 shows the pressure resistance property of the bearing assembly of the present invention as shown in FIG. 1, in comparison with that of a conventional structure, such as shown in FIG. 4, provided that the thickness $h_2$ of the annular magnet 12, that $h_1$ of the pole piece 13 and the gap g is of the same dimension. As shown in FIG. 5, it has been found that the seal means of the present invention can obtain the pressure resistance property more superior to the conventional bearing assembly. The measuring conditions were as follows; $h_1=1$ mm, $h_2=1.5$ mm, $g=0.2$ mm, outer diameter of the pole piece $16\phi$, diameter of the shaft $7\phi$ and revolution per minute 3,600.

Where a magnetic circuit of a conventional seal structure can be formed only through the gaps, the main components of the seal means of this embodiment of the present invention are directly communicated with each other by a magnetic substance except for the gap injected with the ferrofluid to provide a higher magnetic flux density. In other words, the thickness of the annular magnet for obtaining a suitable pressure resistance becomes much smaller than that of the conventional annular magnet.

Thus, a thin seal structure is formed by the two effects with one pole piece being sufficient and with the thickness of the annular magnet being thin. Additionally, it is only necessary to obtain concentricity of only one pole piece.

Figure 2:
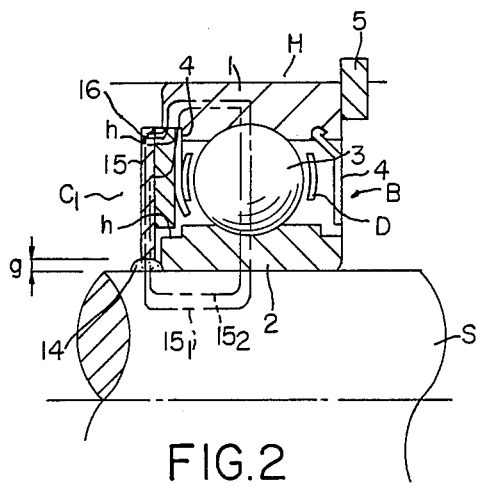
FIG. 2 is a sectional view of a bearing assembly of another embodiment of the present invention.

In the embodiment of FIG. 2, there is formed a recess h at one inner corner of the outer race 1 and the inner race 2, respectively. The upper end of the annular magnet 16 integrally affixed to the pole piece 15 is mounted within the recess h of the outer race 1. The remaining components of the embodiment of FIG. 2 is substantially similar to the components of the first embodiment with like sealing function. The recess h may be only formed in an inner edge of the outer race 1. According to the present invention, magnetic circuits $15_1$ and $15_2$ for retaining ferrofluid in the seal means are formed by way of the bearings. Thus, magnetic circuit $15_1$ is formed by the annular magnet 16, the outer race 1, the balls 3, the inner race 2, the shaft S, the gap 14 and the pole piece 15 and the magnetic circuit $15_2$ is formed by the annular magnet 16, the grease seal plate 4, the outer race 1, the balls 3, the inner race 2, the shaft S, the gap 14 and the pole piece 15.

The present invention have the following effects:

(1) Conventionally, where two pole pieces 6, 6 have been employed, the present invention requires only one pole piece. In addition, it is not necessary to provide a spacer 9 between one pole piece and the bearings B.

Therefore, the thickness $t_1$ of the seal means $C_1$ of the present invention can be formed thinner than that of a conventional seal means C. Particularly as shown in the second embodiment of the present invention, when the annular magnet 16 of the seal means $C_1$ is positioned within the recess h of the outer race 1, the thickness $t_1$ of the seal means $C_1$ can be still further reduced. Accordingly, it is possible to make a motor more compact and thinner.

(2) The annular magnet 12 and the pole piece 13 can be simply mounted to each other. Unlike a conventional seal means, it is not necessary to obtain concentricity of each pole piece. Accordingly, it is easier to obtain concentricity of one pole piece relative to the shaft S and as a result, assembling accuracy of the seal means can be increased and pressure resistance reinforced.

As described previously, the present invention has a great advantage in that the bearing means is employed as magnetic pole, however, the bearing means may deteriorate by passage of the magnetic flux through the bearing means. In such event, the bearing means may become worn, and the resulting powders attracted by magnetism thereby developing certain flaws on the surfaces of the balls.

With regard to such problem, many durability tests have been conducted and it has been found that when the bearing assembly of the present invention is applied, e.g. for a magnetic disc motor, provided that the ambient temperature, load, revolution, assembling accuracy and other parameters are placed in a normal condition, any abrasion rarely occurs. However, the retainer is very much susceptible to be worn, so that it is preferably replaced with a non-magnetic stainless steel or plastic retainer. Particularly, when using a plastic retainer, the bearing assembly of the present invention is free from wearing under lubrication of the grease. Thus, the bearing assembly of the present invention can display higher performance by use of such a plastic retainer.

Further, by retaining a certain quantity of ferrofluid within the bearing means, the balls roll not by the grease, but by the ferrofluid while making use of the magnetic flux within the bearing means. Since there now is used a hard grease which mists, the problem is that the bearing means easily causes abnormal noise, however, with a ferrofluid of very high lubricity, torque is not decreased and there arises no abnormal noise.

While the present invention has been described in connection with an exemplary embodiment thereof, it will be understood that many modifications will be apparent to those of ordinary skill in the art and that this application is intended to cover any adaptations or variations thereof. Changes, therefore, in the construction and arrangement may be made without departing from the spirit and scope of the invention as defined in the appended claims.

What is claimed is:

1. A bearing assembly, which comprises:
a non-magnetic housing;
a rotatable shaft extending through said housing;
bearing means disposed between said housing and said shaft, said bearing means including an outer race mounted in said housing, an inner race and a plurality of balls between said outer race and said inner race, and a grease seal plate mounted within a recess formed in an inner portion of said outer race, along an outside of said outer race; and seal means disposed between said housing and said shaft mounted in said housing and comprising an annular and axially-polarized magnet contacting axially an outside portion of said outer race and with a side of said grease seal plate, a pole piece fixed to an outer side of said magnet opposite to an inner side of said magnet contacting said outer race, said pole piece not being in contact with said outer race and forming a gap with said shaft and a ferrofluid disposed in said gap formed between said pole piece and said shaft thereby forming a magnetic circuit among said annular magnet, said outer race, said balls, said inner race, said shaft, said gap and said pole piece and another magnetic circuit among said annular magnet, said grease seal plate, said outer race, said balls, said inner race, said shaft, said gap and said pole piece.

2. A bearing assembly, which comprises:

a housing;

a rotatable shaft extending through said housing;

bearing means disposed between said housing and said shaft, said bearing means including an outer race mounted in said housing, and an inner race and a plurality of balls disposed between said outer race and said inner race and a grease seal plate mounted within a recess formed along an axial outside of said outer race in an inner portion of said outer race; and seal means disposed between said housing and said shaft, and mounted within said recess and comprised of an annular and axially-polarized magnet partially mounted within said recess and in contact with a side of said grease seal plate, a remaining part of said magnet protruding axially from outside of said outer race, and a pole piece affixed to an outer side of said magnet opposite to an inner side of said magnet mounted in said recess so as not to contact said outer race and forming a gap with said shaft and a ferrofluid disposed in said gap formed between said pole piece and said shaft thereby forming a magnetic circuit among said annular magnet, said outer race, said balls, said inner race, said shaft, said gap and said pole piece and another magnetic circuit among said annular magnet, said grease seal plate, said outer race, said balls, said inner race, said shaft, said gap and said pole piece.

* * * * *